May 16, 1961  J. B. HOLLINGSWORTH  2,984,059
APPARATUS FOR DISPENSING CONFECTION ICE
Filed July 24, 1959  5 Sheets-Sheet 1

INVENTOR.
JACK B. HOLLINGWORTH
BY
McMorrow, Berman & Davidson
ATTORNEYS

May 16, 1961 J. B. HOLLINGSWORTH 2,984,059
APPARATUS FOR DISPENSING CONFECTION ICE
Filed July 24, 1959 5 Sheets-Sheet 2
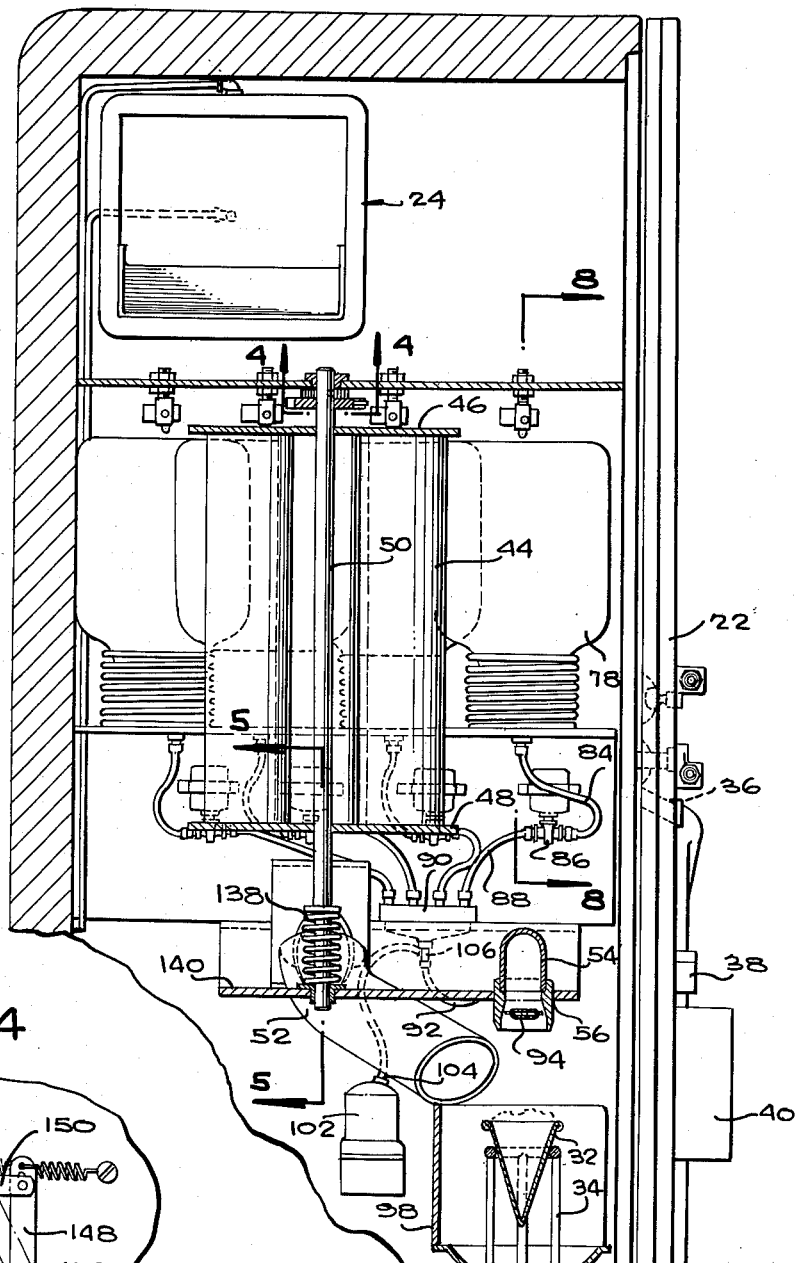
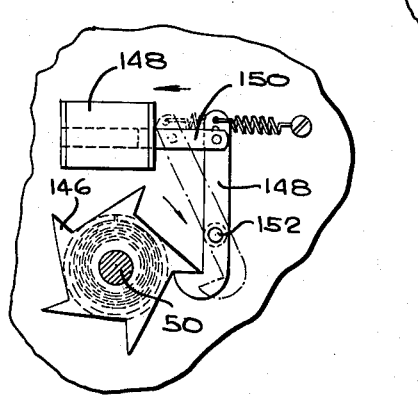
INVENTOR.
JACK B. HOLLINGSWORTH
BY
McMorrow, Berman + Davidson
ATTORNEYS May 16, 1961  J. B. HOLLINGSWORTH  2,984,059
APPARATUS FOR DISPENSING CONFECTION ICE
Filed July 24, 1959  5 Sheets-Sheet 3

INVENTOR.
JACK B. HOLLINGSWORTH
BY
McMorrow, Berman & Davidson
ATTORNEYS

May 16, 1961 J. B. HOLLINGSWORTH 2,984,059
APPARATUS FOR DISPENSING CONFECTION ICE
Filed July 24, 1959 5 Sheets-Sheet 4

INVENTOR.
JACK B. HOLLINGSWORTH
BY
McMorrow, Berman + Davidson
ATTORNEYS

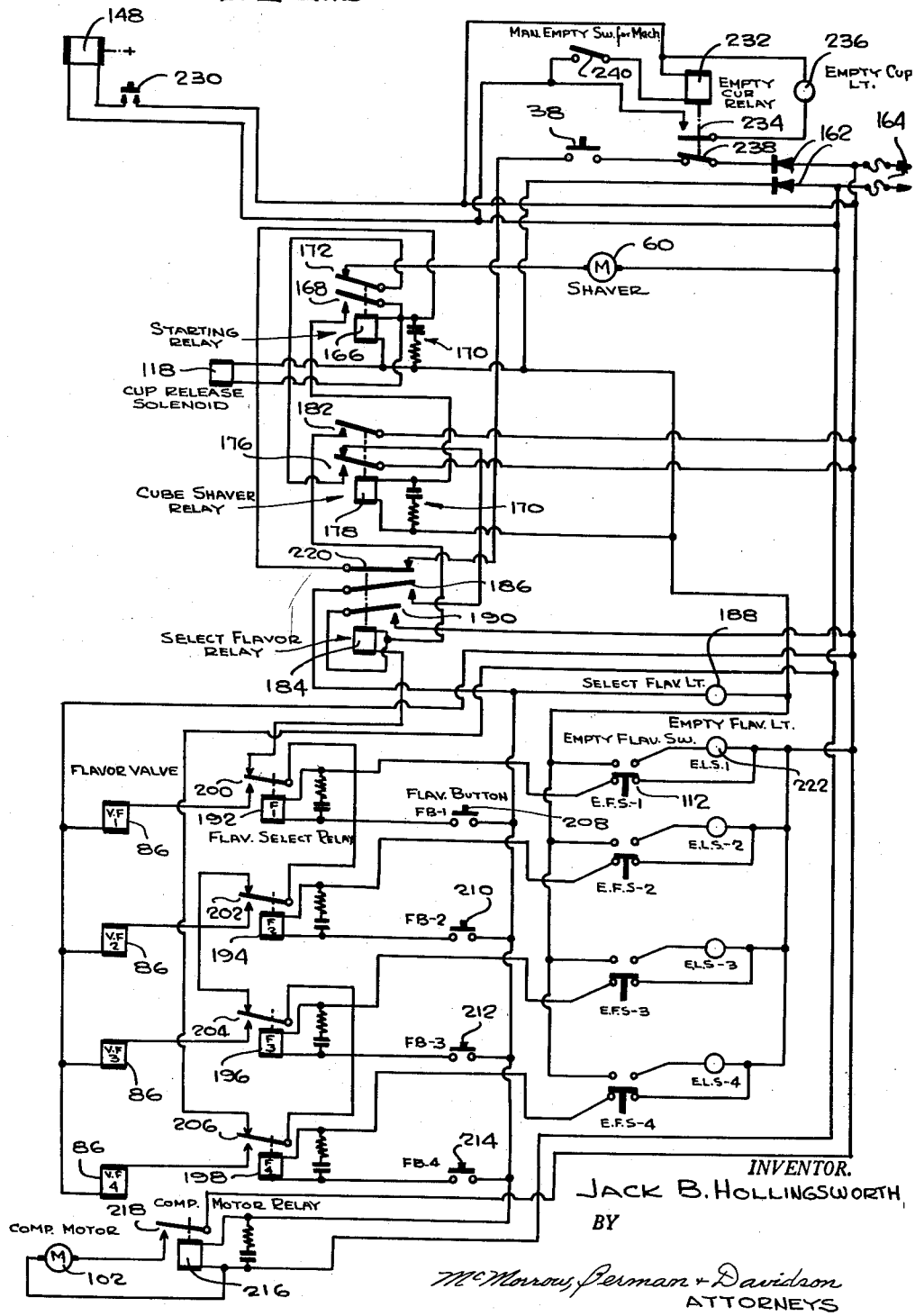

United States Patent Office 2,984,059
Patented May 16, 1961

2,984,059
APPARATUS FOR DISPENSING CONFECTION ICE
Jack B. Hollingsworth, 121 E. Claiborne Square, Chalmette, La.
Filed July 24, 1959, Ser. No. 829,280
7 Claims. (Cl. 53—123)

The present invention relates to a dispensing apparatus generally and specifically to an apparatus for dispensing a confection ice.

It has heretofore been the practice to dispense a confection ice by hand which practice requires the hand filling of a dispensing cup with shaved ice and the pouring of a flavored syrup over the ice. Such a practice is time-consuming and requires an expenditure of labor of a value often in excess of the net profit obtained from the sale of such confections. Additionally, the practice cannot always be carried out under clean and wholesome conditions.

An object of the present invention is to provide an apparatus for dispensing a confection ice which is automatic in operation, one which lends itself to maintaining in a hygienic condition with ease and facility, and one which is economically feasible.

Another object of the present invention is to provide an apparatus for dispensing a confection ice which is foolproof in operation, one having indicating means for indicating the empty condition of either the cup dispenser or the empty conditions of the syrup containers, one simple in structure and having relatively few operating parts, and one which is highly effective in action.

These and other objects and advantages of the present invention will be fully apparent from the following description when taken in conjunction with the annexed drawings, in which:

Figure 3 is a view taken on the line 3—3 of Figure 1 and on an enlarged scale;

Figure 4 is a view taken on the line 4—4 of Figure 3 and on an enlarged scale;

Figure 15 is a schematic view of the electrical circuit employed with the apparatus of the present invention.

Figure 1:
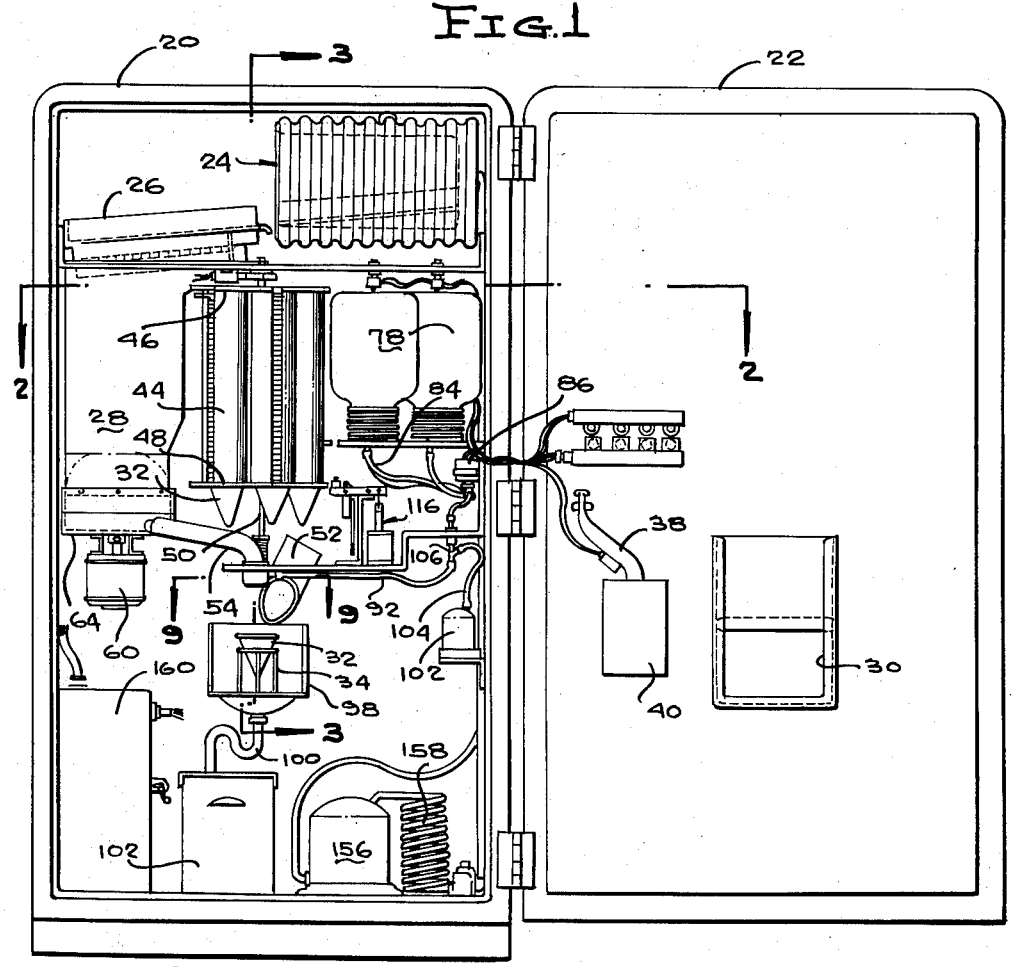
Figure 1 is an elevational view of the apparatus according to the present invention with the door of the cabinet swung wide to expose the contents of the cabinet.
Figure 2:
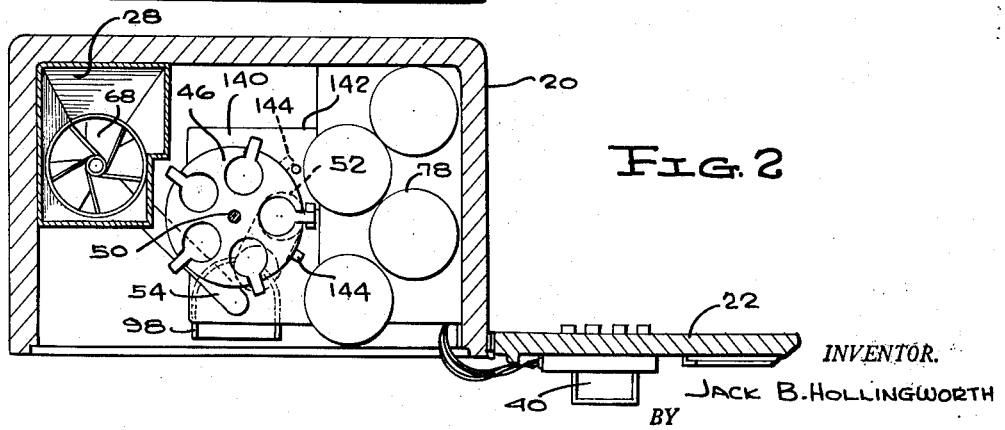
Figure 2 is a view taken on the line 2—2 of Figure 1.

Referring in greater detail to the drawings in which like numerals indicate like parts throughout the several views, in Figures 1 to 3, the numeral 20 designates generally an upright cabinet having an open front with a door 22 hingedly mounted on the cabinet open front for movement from an open position to a closed position, the door 22 being shown in open position.

Within the cabinet 20 is an ice making machine 24 having a delivery tray 26 arranged in superimposed relation with respect to the open top of an ice storage tank 28. The ice making machine 24 and delivery tray 26 are conventional in construction and produce ice in cube form automatically for delivery into the tank 28 and have suitable controls for halting the making of ice cubes when a sufficient number of ice cubes have been delivered into the tank 28. Such machines with their controls are commercially available and are not further described here for reasons of simplification.

The door 22 is provided with an access opening 30 through which an individual may reach to remove a cup 32 from a holder 34 positioned behind the door 22 when the door is in the closed position.

The front of the door also has a slot therethrough for insertion of a coin, the slot being shown in dotted lines in Figure 3 and designated by the numeral 36. A coin inserted through the slot 36 actuates a coin-operated switch mechanism 38, also of conventional construction, as the coin travels to a collection box 40 fastened on the inside of the door 22.

Within the cabinet 20 is an overheated supply of dispensing cups 32 supported in a dispensing mechanism 42 which consists in five vertically arranged tubes 44 supported between upper and lower plates 46 and 48 which are carried on a vertical shaft 50 for rotation with the shaft 50 so that each tube 44 becomes in turn in registry with a chute 52 cooperatively mounted between the supply of cups 32 and the holder 34 for delivering a cup 32 to the holder 34.

A delivery conduit 54 extends from the bottom of the ice storage tank 28 to a dispensing barrel 56 above and spaced from the holder 34, the conduit being adapted for conveying shaved ice from the tank 28 to a cup 32 when the latter is supported in the holder 34. In the bottom of the tank 28 (Figures 10 to 14) is an ice shaving device designated generally by the numeral 58. The device 58 includes an electric motor 60 having its shaft 62 extending upwardly into the bottom of a casing 64 mounted on the bottom of the tank 28.

The casing 64 includes an upper ring 66 having therein a plurality of radially extending and slanting blades 68. The blades 68 have their outer ends fixed to the ring 66 and their inner ends secured to a sleeve 70 serving as a bearing for the upper end portion of the shaft 62. Each blade 68 is punched through at several points to provide a downwardly turned spike element 72 for gripping ice cubes received through the bottom of the tank 28 and for holding the same for shaving by the blades 74 on a rotating disc 76 which is secured to the shaft 62 for rotation therewith.

Figure 8:
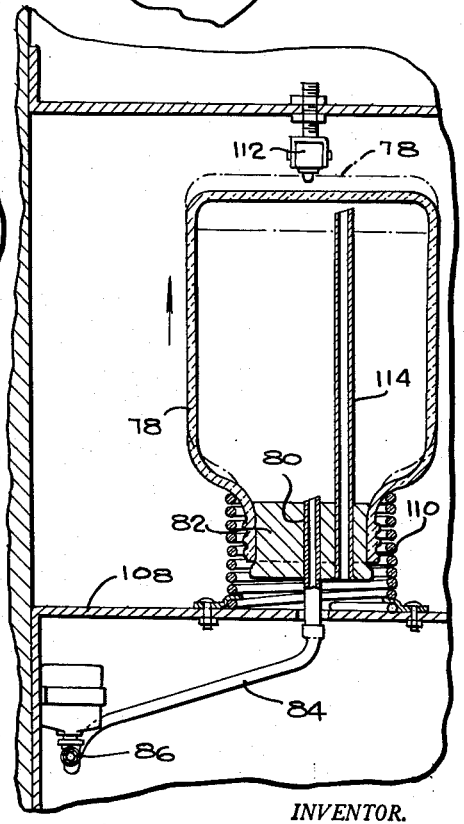
Figure 8 is a fragmentary view on an enlarged scale, taken on the line 8—8 of Figure 3.
Figure 9:
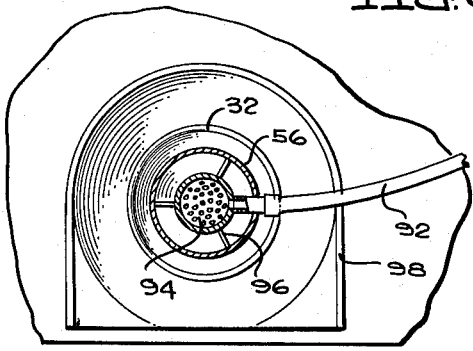
Figure 9 is a view on an enlarged scale, taken on the line 9—9 of Figure 1.
Figure 10:
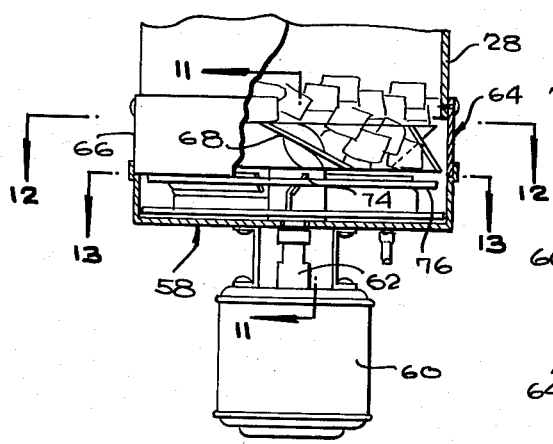
Figure 10 is a fragmentary view showing the lower end portion of the ice storage tank and the ice shaver mechanism, a portion of the side wall of the tank being broken away.
Figure 11:
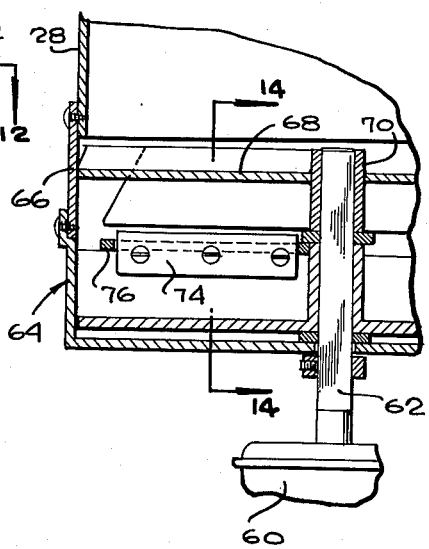
Figure 11 is a view on an enlarged scale, taken on the line 11—11 of Figure 10 and showing the motor partially broken away.
Figure 12:
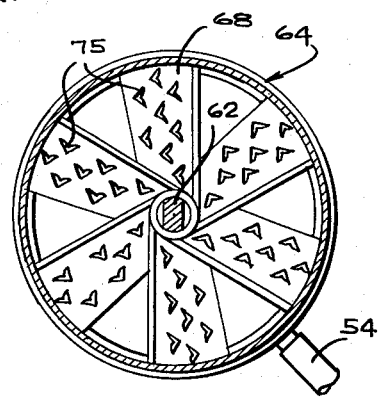
Figure 12 is a view taken on the line 12—12 of Figure 10.
Figure 14:
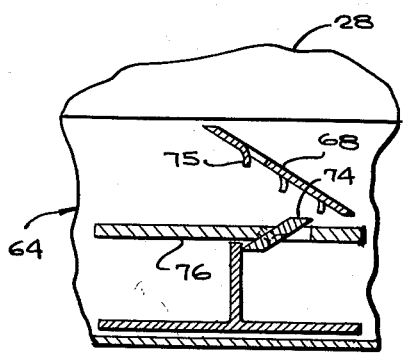
Figure 14 is a view taken on the line 14—14 of Figure 11.
Figure 13:
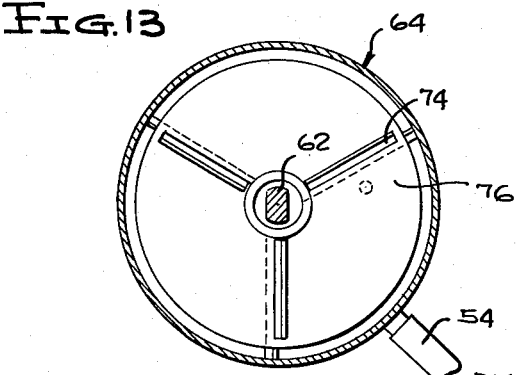
Figure 13 is a view taken on the line 13—13 of Figure 10.

A plurality of inverted jars 78 are supported within the cabinet 20, each jar 78 containing a supply of a confection, such as syrup or the like, in liquid form. A different confection is contained in each jar 78. Conduit means is provided connecting each of the jars 78 to the area of the discharge of the ice bearing conduit 54, such conduit means including (Figures 8 and 9) a tube 80 extending through a closure member 82 closing the lower open end of the jar 78. The lower end of the tube 80 is connected by another tube 84 to a solenoid actuated valve 86 mounted on the wall of the cabinet 20, as shown in Figures 1 and 3. Another tube 88 connects each valve 86 with a collector 90 which has its bottom connected by a tube 92 to the barrel 56.

Within the barrel 56 is a dispensing head 94 connected in communication with the end of the tube 92 and supported within the barrel 56 on spider elements 96. The holder 34 is supported in a shell 98 having an open front in registry with the opening 30 in the door 22. A drain 100 extends from the bottom of the shell 98 for carrying off any melted ice or spilled syrup. A container 102 is connected to the lower end of the drain 100 and is insertable into and out of the cabinet 20 through the open front when the door 22 is in open condition.

Air under pressure means is provided operatively connected to the tube 92 to introduce air under pressure into the flow of the liquid confection received from one of the jars 78 responsive to closing of the switch which actuates the associated solenoid valve 86 which permits discharge of a predetermined charge of a selected confection or syrup from the related jar 78 into one of the cups 32 when it is supported in the holder 34. This air under pressure means consists in an air compressor 102 mounted upon the wall of the cabinet 20 and having its discharge outlet connected by a tube 104 to a Y coupling 106 provided in the tube 92.

Each jar 78 is supported above a shelf 108 by means of a coil spring 110 (Figure 8) which is compressed by the weight of the contents of the jar 78 so that as the jar 78 discharges its contents and becomes empty, the coil spring 110 expands to drive the jar upwardly to the dotted line position and effect the closing of a microswitch 112. The switch 112, when closed, serves to provide a signal showing that the particular jar 78 is empty of its contents, as will be explained later with reference to the electrical circuit employed with the apparatus of the present invention.

Each of the jars 78 is provided with an inlet tube 114 for the admission of air to replace the contents of the jar 78 as the latter is discharged through the tube 80.

Figure 5:
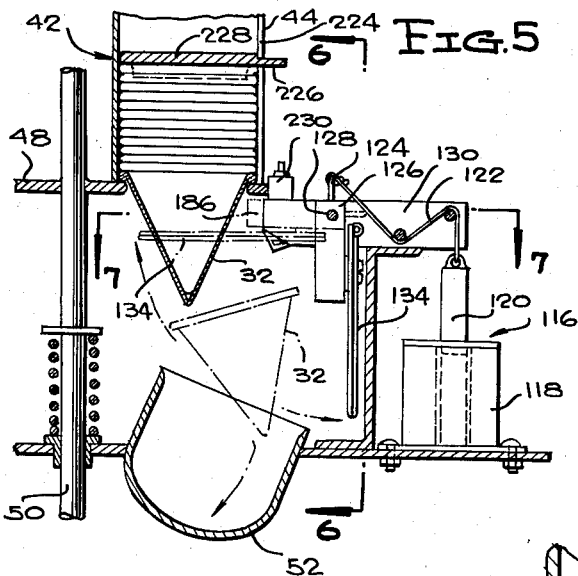
Figure 5 is a view on an enlarged scale, taken on the line 5—5 of Figure 3, showing a cup in dotted lines in position entering the cup positioning chute.
Figure 6:
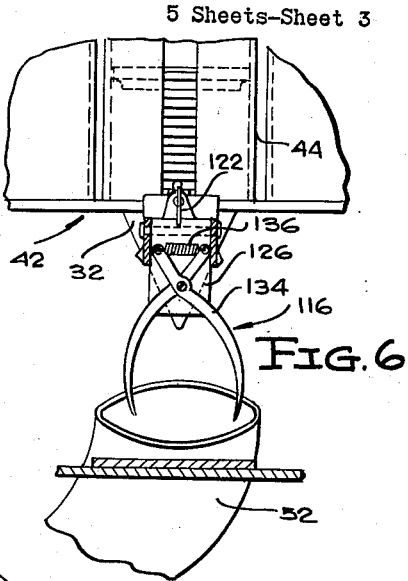
Figure 6 is a view taken on the line 6—6 of Figure 5.

The present invention provides positive means for taking a cup 32 from one of the tubes 44 and delivering the same to the upper end of the chute 52. This means consists in a transfer mechanism designated generally by the reference numeral 116 and shown most clearly in Figures 5 to 7.

Figure 7:
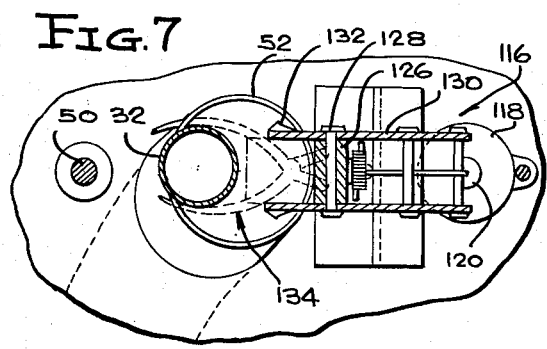
Figure 7 is a view taken on the line 7—7 of Figure 5.

The mechanism 116 includes a solenoid coil 118 having its core 120 suspended from a flexible element 122. The end of the element 122 remote from the core 120 is secured to an eye formation 124 projecting from one end of a weighted block 126. The block 126 is pivotally mounted upon a pin 128 spaced inwardly from the end of the block 126 carrying the eye formation 124. As shown in Figure 7, the end portions of the pin 128 are anchored in a pair of laterally spaced bars 130 which have their lower complemental ends flared outwardly as at 132. Pivotally connected to one face of the block 126 is a tong device 134 having its legs projecting outwardly beyond the end of the block 126 and swingable with the block 126 from the full line position or vertical position shown in Figure 5 to the dotted line position or horizontal position.

When the tong device 134 swings from the vertical position to the horizontal position, the short legs enter between the flared ends of the bars 130, causing the movement toward each other of the long legs of the device 134 so as to grippingly engage the sides of the cup 32 supported in the lower end of the adjacent tube 44 of the dispensing mechanism 42.

A spring 136 extends between the short legs of the tong device 134 and biases the short legs away from each other so that the long legs return to their normal expanded condition when the block 126 swings of its own weight from the horizontal position to the vertical position after release of the core 120 from the solenoid 118. This results in freeing of the cup 32 for travel into the open upper end of the chute 52.

Means is provided in the dispensing mechanism 42 for shifting the tubes 44 in turn so as to empty each tube of its cups 32. This means consists in a coil spring 138 circumposed about a lower end portion of the shaft 50. One end of the spring 138 is secured to the shaft 50 and the other end is secured to the adjacent portion of a shelf 140 which supports the shaft 50 and also supports the barrel 56.

In Figure 2, there will be seen a pin 142 projecting upwardly from the shelf 140 and in the path of movement of a lug 144 which projects from the periphery of the lower plate 48. When the plate 48 turns to the position in which the lug 144 is shown in dotted lines, the last tube 44 will have been brought into registry with the upper end of the chute 52 which is shown in dotted lines.

In Figure 4, means is illustrated showing how the shaft 50 is rotated a fifth of a turn at a time to bring each tube 44 into registry with the chute 52. This means consists in a star wheel 146 and a latch element 148 having one end in engagement with the star wheel 146 and having the other end secured to the core 150 of the solenoid 152. Upon energization of the solenoid 152, the latch element 148 pivots about a fixed pin 152 as an axis and releases the star wheel 146 for movement under impetus of the spring 138 so that the shaft 50 rotates until the next point on the wheel 146 is engaged by the adjacent end of the latch element 148.

The means energizing the solenoid 152 will be described with reference to Figure 15.

Referring again to Figure 1, in the bottom of the cabinet 20 is seen the compressor and evaporator coil 156 and 158, respectively, of the ice making machine 24. Also in the bottom of the cabinet 20 is a housing 160 within which is the electrical mechanism for operating the various components of the apparatus of the present invention, as shown diagrammatically in Figure 15.

In operation, the transfer mechanism 116 constitutes a first electrically actuable means operatively connected to the supply of cups 32 and operable upon closing of a first switch to introduce a cup 32 from the adjacent tube 44 into the chute 52 and to direct the same into the holder 34.

With reference to Figure 15, the solenoid 118, previously described with reference to the transfer mechanism 116, is shown in circuit with the previously described coin-operated switch mechanism 38, a pair of rectifiers 162, and a source of current as at 164.

Upon dropping of a coin through the slot 36 and actuation of the switch mechanism 38, the solenoid 118 is energized and the tong device 134 is drawn upwardly to grasp a cup 32 and to drop the same into the chute 52. At the same time, the coil of a starting relay 166 is energized and a first switch 168 is shifted from the normally open position to a closed position. The switch 168 and the switch mechanism 38 constitute together a first normally open switch for the reason that they work in unison to effect the starting of the mechanism of the apparatus of the present invention.

The relay 166, of conventional construction, is of the type having a decay-capacitor delay means, as at 170, incorporated therein so that after the coil of the relay 166 is deenergized, the switch 168 remains in closed position for a predetermined length of time.

With further reference to Figure 15, the motor 60 of the ice shaving device 58 is seen to be connected on one side with the source of current at 164 and on the other side with a normally closed switch 172 which is incorporated in the relay 166. Upon actuation of the relay 166, the switch 168 closes and the coil of another relay 174 is energized and a switch 176 incorporated therein is moved from the normally open position to a closed position. Meanwhile, the switch 172 of the relay 166 has been opened and current flow to the motor 60 is interrupted until the relay 166 relaxes and again closes the switch 172 to permit flow of current from the closed switch 172 through the switch 176 of the relay 178 to the other side of the current source 164.

The cup release solenoid 118 is in circuit with the relay 166 and its associated delay means 170 so that the transfer mechanism 116 reaches the end of its cycle of operation in conjunction with the relaxing of the relay 166.

Means is also provided, as will be described later, so that when the ice has filled the selected cup, the switch mechanism 38 is moved to open position, cutting off flow of current to the relay 166 and cup release solenoid 118. The delay means 170 of the relay 178 has a longer period of operation than the previously mentioned delay means so that the relay 178 is kept in the energized condition for a period of time to let the shaver motor 60 operate until a predetermined amount of shaved ice is delivered into the cup 32 in the holder 34.

Upon energization of the relay 178, another switch 182 moves from the normally open position to a closed position to energize a main flavor select relay 184. Upon energization of the relay 184, a switch 186, associated with the relay 184, is closed and a lamp 188 is caused to be illuminated. The lamp 188 is mounted in the door 22 of the cabinet 20. Simultaneously, another switch 190 is closed by the energization of the relay 184 and current to the relay 184 continues to flow to the relay 184 even after the switch 182 opens on relaxation of the relay 178.

Associated with the relay 184 are other relays 192, 194, 196, and 198.

The relays 192, 194, 196, and 198, have double acting switches 200, 202, 204, and 206, respectively, which are normally in a position which permits current to flow from one side of the relay 184 to one side of the current source 164. The other side of the current source is conducted to the relay 184 through the previously mentioned switch 190 which is closed upon actuation of the relay 184.

Mounted on the outside of the door 22 are push buttons 208, 210, 212, and 214, each associated with one of the jars 78 and in circuit with the relays 192, 194, 196, and 198, respectively.

On selection of the flavor desired, the customer pushes one of the buttons 208, 210, 212, or 214, according to indicia adjacent such button on the door 22. For instance, if the push button 208 is moved to closed position, the relay 192 shifts the switch 200 to break the circuit of the relay 184 and open the switches 186 and 190. Simultaneously, the switch 200 moves to the position energizing the associated solenoid valve 86 which permits the selected syrup to flow into the collector 90 and then through the tube 92 to the head 94.

Simultaneously, with the energization of any one of the relays 192, 194, 196, or 198, another relay 216 is energized and a switch 218 is closed to energize the air compressor 102. The relay 216 is also of the time delay type and the motor of the compressor 102 will operate long enough to force air through the head 94 to spray the selected liquid confection onto the shaved ice in the cup 32.

Another and normally closed switch 220 in the relay 184 is opened upon energization of the relay 184 and cuts out the switch mechanism 38 until one of the push buttons 208, 210, 212, or 214 is depressed.

In circuit with each of the push buttons 208, 210, 212, and 214, is one of the previously described microswitches 112 operated by the related confection-containing jar 78, when the latter is emptied. Upon actuation of any one of the switches 112 an associated bulb 222 is energized to indicate that that particular flavor of confection is not available in the machine.

Referring again to Figure 5, each tube 44 is slotted as at 224 and a lug 226 on one side of a pressure plate 228 projects through the slot 224. A microswitch 230 is mounted on the plate 48 in the path of movement of the lug 226 so that when the cups 32 are emptied from the particular tube 44, the microswitch 230 is closed.

The switch 230 is in circuit with the latch element 148 and each energization of the switch 230 effects the release of the star wheel 146 so as to permit the spring 138 to drive the shaft 50 so as to bring the next tube 44 into registry with the upper end of the chute 52.

When the last tube 44 is emptied and the lug 144 on the plate 48 engages the pin 142, the switch 230 will remain energized and another relay will be energized, as at 232 in Figure 15, closing a switch 234 to illuminate a signal lamp 236 and opening another switch 238 which deenergizes the coin-operated switch 38 and prevents operation of the apparatus.

A manually operable switch 240 is in circuit with the relay 232 and may be employed by the individual charged with servicing the apparatus to deenergize the machine while he fills the tubes 44 and replaces the jars 78.

The motor 60 constitutes a second electrically actuable means operatively connected to the ice shaver device 58 and operable to shave and deliver a predetermined charge of shaved ice to the delivery conduit 54 responsive to closing of the switch 172 responsive to opening of the switch 168 upon relaxation of the relay 166.

What is claimed is:

1. In an apparatus for dispensing confection ice, a holder for a dispensing cup, an overhead supply of dispensing cups, a chute cooperatively mounted between said supply and holder for delivering a cup to said holder, a first normally open switch, a first electrically actuable means operatively connected to said supply and operable upon closing of said first switch to introduce a cup from said supply into said chute and direct same into said holder, a delivery conduit for conveying shaved ice therethrough mounted so as to discharge into a cup when supported in said holder, a storage tank, a supply of ice in said tank, said tank being connected in communication with said conduit, an ice shaving device cooperatively mounted in said tank, a second normally open switch, a second electrically actuable means operatively connected to said device and operable to shave and deliver a predetermined charge of shaved ice to said conduit upon closing of said second switch responsive to the opening of said first switch, a plurality of supplies of different confections in liquid form, conduit means connecting each of said supplies to the area of the discharge of said conduit, a normally open switch operatively connected to each of said supplies, and a third electrically actuable means operatively connected to each of said last-mentioned normally open switches and actuable upon closing of one of said last-mentioned normally open switches to permit discharge of a predetermined charge of selected confection from the related confection supply into a cup when supported in said holder responsive to the opening of said second switch.

2. In an apparatus for dispensing confection ice, a holder for a dispensing cup, an overhead supply of dispensing cups, a chute cooperatively mounted between said supply and holder for delivering a cup to said holder, a first normally open switch, a first electrically actuable means operatively connected to said supply and operable upon closing of said first switch to introduce a cup from said supply into said chute and direct same into said holder, a delivery conduit for conveying shaved ice therethrough mounted so as to discharge into a cup when supported in said holder, a storage tank, a supply of ice in said tank, said tank being connected in communication with said conduit, an ice shaving device cooperatively mounted in said tank, a second normally open switch, a second electrically actuable means operatively connected to said device and operable to shave and deliver a predetermined charge of shaved ice to said conduit upon closing of said second switch responsive to the opening of said first switch, a plurality of supplies of different confections in liquid form, conduit means connecting each of said supplies to the area of the discharge of said conduit, a normally open switch operatively connected to each of said supplies, a third electrically actuable means operatively connected to each of said last-mentioned normally open switches and actuable upon closing of one of said last-mentioned normally open switches to permit discharge of a predetermined charge of selected confection from the related confection supply into a cup when supported in said holder responsive to the opening of said second switch, and air under pressure means operatively connected to said conduit means and operable to introduce air into the flow of liquid confection upon closing of one of said last-mentioned normally open switches.

3. In an apparatus for dispensing confection ice, a holder for a dispensing cup, an overhead supply of dispensing cups, a chute cooperatively mounted between said supply and holder for delivering a cup to said holder, a first normally open switch, a first electrically actuable means including a transfer mechanism operatively connected to said supply and operable upon closing of said first switch to introduce a cup from said supply into said chute and direct same into said holder, a delivery conduit for conveying shaved ice therethrough mounted so as to discharge into a cup when supported in said holder, a storage tank, a supply of ice in said tank, said tank being connected in communication with said conduit, an ice shaving device cooperatively mounted in said tank, a second normally open switch, a second electrically actuable means operatively connected to said device and operable to shave and deliver a predetermined charge of shaved ice to said conduit upon closing of said second switch responsive to the opening of said first switch, a plurality of supplies of different confections in liquid form, conduit means connecting each of said supplies to the area of the discharge of said conduit, a normally open switch operatively connected to each of said supplies, and a third electrically actuable means operatively connected to each of said last-mentioned normally open switches and actuable upon closing of one of said last-mentioned normally open switches to permit discharge of a predetermined charge of selected confection from the related confection supply into a cup when supported in said holder responsive to the opening of said second switch.

4. In an apparatus for dispensing confection ice, a holder for a dispensing cup, an overhead supply of dispensing cups, a chute cooperatively mounted between said supply and holder for delivering a cup to said holder, a first normally open switch, a first electrically actuable means including a transfer mechanism and a solenoid operatively connected to said mechanism operatively connected to said supply and operable upon closing of said first switch to introduce a cup from said supply into said chute and direct same into said holder, a delivery conduit for conveying shaved ice therethrough mounted so as to discharge into a cup when supported in said holder, a storage tank, a supply of ice in said tank, said tank being connected in communication with said conduit, an ice shaving device cooperatively mounted in said tank, a second normally open switch, a second electrically actuable means operatively connected to said device and operable to shave and deliver a predetermined charge of shaved ice to said conduit upon closing of said second switch responsive to the opening of said first switch, a plurality of supplies of different confections in liquid form, conduit means connecting each of said supplies to the area of the discharge of said conduit, a normally open switch operatively connected to each of said supplies, and a third electrically actuable means operatively connected to each of said last-mentioned normally open switches and actuable upon closing of one of said last-mentioned normally open switches to permit discharge of a predetermined charge of selected confection from the related confection supply into a cup when supported in said holder responsive to the opening of said second switch.

5. In an apparatus for dispensing confection ice, a holder for a dispensing cup, an overhead supply of dispensing cups, a chute cooperatively mounted between said supply and holder for delivering a cup to said holder, a first normally open switch, a first electrically actuable means including a transfer mechanism operatively connected to said supply and operable upon closing of said first switch to introduce a cup from said supply into said chute and direct same into said holder, a delivery conduit for conveying shaved ice therethrough mounted so as to discharge into a cup when supported in said holder, a storage tank, a supply of ice in said tank, said tank being connected in communication with said conduit, an ice shaving device cooperatively mounted in said tank, a second normally open switch, a second electrically actuable means embodying an electric motor operatively connected to said device and operable to shave and deliver a predetermined charge of shaved ice to said conduit upon closing of said second switch responsive to the opening of said first switch, a plurality of supplies of different confections in liquid form, conduit means connecting each of said supplies to the area of the discharge of said conduit, a normally open switch operatively connected to each of said supplies, and a third electrically actuable means operatively connected to each of said last-mentioned normally open switches and actuable upon closing of one of said last-mentioned normally open switches to permit discharge of a predetermined charge of selected confection from the related confection supply into a cup when supported in said holder responsive to the opening of said second switch.

6. In an apparatus for dispensing confection ice, a holder for a dispensing cup, an overhead supply of dispensing cups, a chute cooperatively mounted between said supply and holder for delivering a cup to said holder, a first normally open switch, a first electrically actuable means operatively connected to said supply and operable upon closing of said first switch to introduce a cup from said supply into said chute and direct same into said holder, a delivery conduit for conveying shaved ice therethrough mounted so as to discharge into a cup when supported in said holder, a storage tank, a supply of ice in said tank, said tank being connected in communication with said conduit, an ice shaving device cooperatively mounted in said tank, a second normally open switch, a second electrically actuable means operatively connected to said device and operable to shave and deliver a predetermined charge of shaved ice to said conduit upon closing of said second switch responsive to the opening of said first switch, a plurality of supplies of different confections in liquid form, conduit means connecting each of said supplies to the area of the discharge of said conduit, a normally closed valve in each of said conduit means, a normally open switch operatively connected to each of said supplies, and a third electrically actuable means including a solenoid operatively connected to each of said last-mentioned normally open switches and to each of said valves and actuable upon closing of one of said last-mentioned switches to open the related one of said valves to permit discharge of a predetermined charge of selected confection from the related confection supply into a cup when supported in said holder responsive to the opening of said second switch.

7. In an apparatus for dispensing confection ice, a holder for a dispensing cup, an overhead supply of dispensing cups, a chute cooperatively mounted between said supply and holder for delivering a cup to said holder, a first normally open switch, a first electrically actuable means operatively connected to said supply and operable upon closing of said first switch to introduce a cup from said supply into said chute and direct same into said holder, a delivery conduit for conveying shaved ice therethrough mounted so as to discharge into a cup when supported in said holder, a storage tank, a supply of ice in said tank, said tank being connected in communication with said conduit, an ice shaving device cooperatively mounted in said tank, a second normally open switch, a second electrically actuable means operatively connected to said device and operable to shave and deliver a predetermined charge of shaved ice to said conduit upon closing of said second switch responsive to the opening of said first switch, a plurality of supplies of different confections in liquid form, conduit means connecting each of said supplies to the area of the discharge of said conduit, a normally open switch operatively connected to each of said supplies, and a third electrically actuable means operatively connected to each of said last-mentioned normally open switches and actuable upon closing of one of said last-mentioned normally open switches to permit discharge of a predetermined charge of selected confection from the related confection supply into a cup when supported in said holder responsive to the opening of said second switch, each of said first and second switches including a time delay electrically operable relay.

References Cited in the file of this patent
UNITED STATES PATENTS

| | | |
|---|---|---|
| 2,617,510 | Little | Nov. 11, 1952 |
| 2,779,165 | Pichler et al. | Jan. 29, 1957 |
| 2,879,811 | Parraga | Mar. 31, 1959 |
| 2,919,724 | Anderson | Jan. 5, 1960 |